Nov. 15, 1949     D. ROSS     2,488,101
ELECTRIC WELDING OF METAL STRIP
Filed Dec. 12, 1947     2 Sheets-Sheet 1
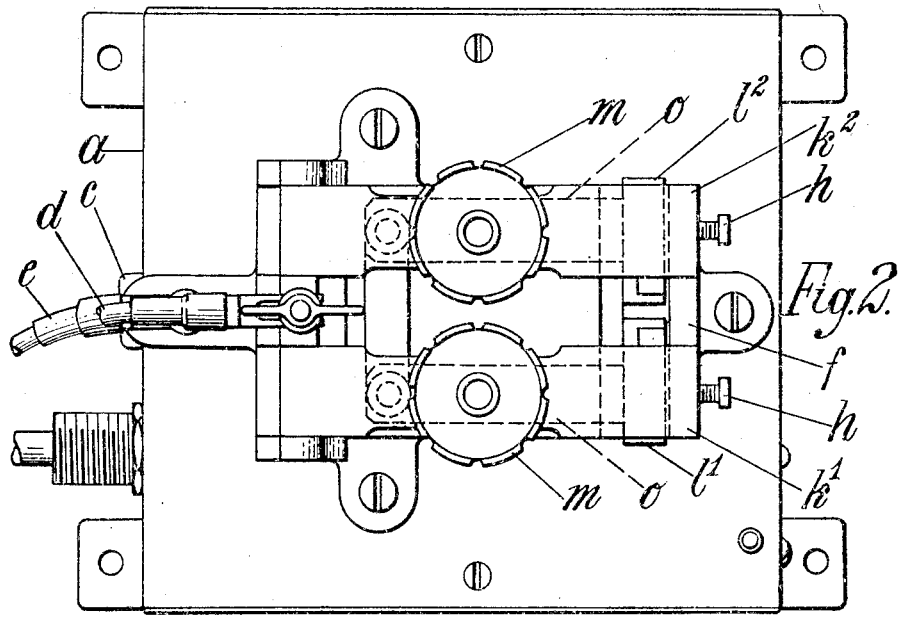

Patented Nov. 15, 1949

2,488,101

UNITED STATES PATENT OFFICE 2,488,101

ELECTRIC WELDING OF METAL STRIP

Donald Ross, London, England

Application December 12, 1947, Serial No. 791,233
In Great Britain June 27, 1947

3 Claims. (Cl. 219—12)

This invention has for its object to devise simple and effective means for welding, brazing, soldering or similarly uniting two lengths of metal wire, rod or strip.

According to my invention I heat the abutting or overlapping ends of the wires or the like by clamping them adjacent such ends between carbon or like electrodes between which an electric current is passed.

According to a further feature of the invention the heat is localised to the immediate neighbourhood of the ends of the wire or the like to be united.

The invention also consists in apparatus for carrying out the above methods in which the electrodes are adapted to make substantially point or line contact with the wires or the like.

Further features of the invention will be apparent from the description given hereafter.

The accompanying drawings illustrate one convenient form of apparatus in accordance with the invention.

Figure 1 is a front elevation showing the upper part of the apparatus.

Figure 2 is a plan, and

Figure 3:
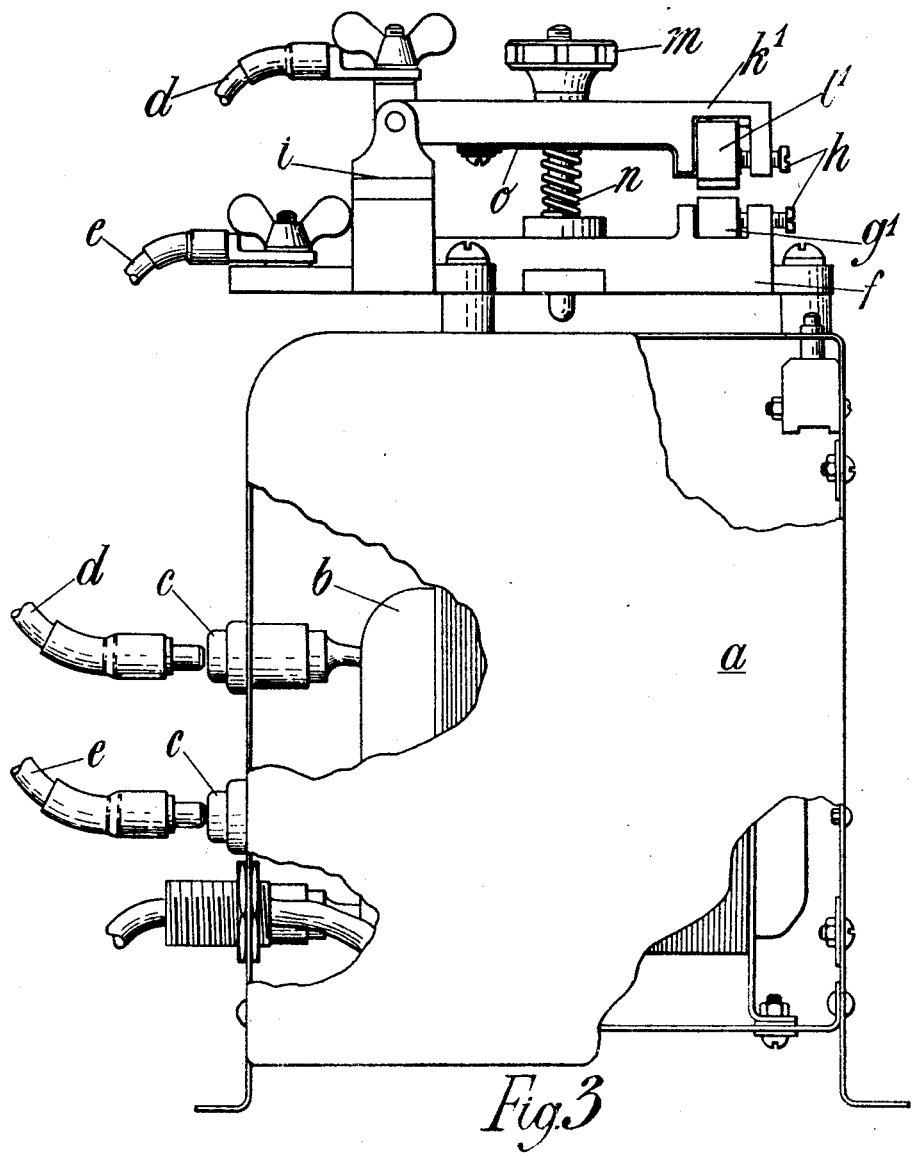
Figure 3 is a side view of the apparatus with parts broken away.

In carrying my invention into effect in one convenient manner I form my improved apparatus with a box or casing $a$ housing a transformer $b$ with suitable sockets $c$ or other terminals to which one end of each of two leads $de$ may be connected. Above the box or container I mount a suitable metallic base $f$ in a channel or the like at one end of which I locate two carbon electrodes $g'g^2$ such electrodes being held in place by screws $h$ or being otherwise removable for renewal as and when required. One of the before-mentioned leads $e$ is removably connected to the metallic base. Upon this base but suitably insulated therefrom I secure a bracket $i$ on which are pivotally mounted two arms $k'k^2$, the free ends of which carry two more carbon electrodes $l'l^2$ adapted to cooperate with those in the base. The electrodes are adapted to be adjusted towards and away from one another by screw means $m$ acting on the arms $l'l^2$ carrying the movable electrodes, such screw means being, if desired, associated with resistance springs $n$ so as to facilitate accurate adjustment of the electrodes. The two pairs of electrodes are separated somewhat from one another by a central space (as clearly shown in Figure 1) and the arms carrying the movable electrodes are also separated so that access may be obtained from above to the abutting or overlapping ends of the wires or the like to be united when the two wires or the like have been clamped between the co-operating pairs of electrodes. The other lead $d$ is connected to the bracket $i$ and thence to the arms $k'$ and $k^2$, and preferably copper or other good conducting bars or strips $o$ connect the arms to the electrodes so as to equalize the current to the latter.

The abutting or overlapping ends of the wires or the like are thus brought to welding or brazing heat by resistance heating by means of electric current passing between the electrodes and a pre-fluxed brazing or welding filler wire or the like may be brought down from above into contact with the heated ends. If necessary or desirable the co-operating pairs of electrodes may be somewhat grooved or channelled to assist in the proper location and holding of the wires or the like.

The invention is particularly suitable for the uniting of very fine wires although it may be applied to thicker wires or rods or to flat or other shaped metal strip and particularly when applying the invention to fine wires I find it advisable to localise the heat as closely as possible to the neighbourhood of the ends to be united as otherwise very fine wires in particular would tend to sag when softened by heating along their length and would thus break under their own weight. This may be very conveniently effected by inclining the electrodes relatively to one another so that the wires or the like may be held only by the inner ends of the electrodes which will thus make substantially point or line contact with the wires. The actual meeting faces of the electrodes may be inclined or tapered or the electrodes may be of normal rectangular shape and may be mounted in inclined grooves or channels in the base and pivoted arms respectively.

In the particular construction shown the fixed electrodes $g'g^2$ are horizontal and the movable electrodes $l'l^2$ are inclined but the inner ends of the faces are flattened off so as somewhat to increase the length of wires held between electrodes.

It is to be understood that the invention is not limited to the foregoing details which are given purely by way of example to indicate the nature of the invention and not to limit its scope and I may vary the form of electrodes, the means for supplying current thereto and the arrangements for adjusting them relatively to one another de-

I claim:

1. An arrangement for uniting two overlapping lengths of metal comprising a transformer, a metallic base connected to one side of the transformer secondary winding and supporting two adjacent but separated carbon electrodes, a bracket on which are pivotally mounted two arms connected to the other side of the transformer secondary winding, the free ends of which arms each carry a carbon electrode so that each of these two carbon electrodes co-operates with a corresponding electrode of the two electrodes on the metallic base, and means intermediate said arms for adjusting the two electrodes of each co-operating pair of electrodes towards or away from each other.

2. An arrangement for uniting two overlapping lengths of wire comprising a transformer, a metallic base connected to one side of the transformer secondary winding and supporting two adjacent but separated carbon electrodes, a bracket on which are pivotally mounted two arms connected to the other side of the transformer secondary winding, the free ends of which arms each carry a carbon electrode so that each of these two carbon electrodes co-operates with a corresponding electrode of the two electrodes on the metallic base, and means intermediate said arms for adjusting the two electrodes of each co-operating pair of electrodes towards or away from each other, the meeting faces of the electrodes of said pairs of electrodes being inclined to one another so that the wire to be united is only held by the inner end of one electrode of the pair of electrodes.

3. An arrangement for uniting two overlapping lengths of wire comprising a transformer, a metallic base connected to one side of the transformer secondary winding and supporting two adjacent but separated carbon electrodes, a bracket on which are pivotally mounted two arms connected to the other side of the transformer secondary winding, the free ends of which arms each carry a carbon electrode so that each of these two carbon electrodes co-operates with a corresponding electrode of the two electrodes on the metallic base, and means intermediate said arms for adjusting the two electrodes of each co-operating pair of electrodes towards or away from each other, the meeting faces of the electrodes of said pairs of electrodes being inclined to one another so that the wire to be united is only held by the inner end of one electrode of the pair of electrodes, said inner ends being flattened off.

DONALD ROSS.

REFERENCES CITED

The following references are of record in the file of this patent:

UNITED STATES PATENTS

| Number | Name | Date |
|---|---|---|
| 1,243,004 | Taylor | Oct. 16, 1917 |
| 1,357,080 | Peck | Oct. 26, 1920 |
| 1,580,794 | Seltzer | Apr. 13, 1926 |
| 1,679,088 | Koehler | July 31, 1928 |
| 2,348,884 | Dewees | May 16, 1944 |